UNITED STATES PATENT OFFICE.

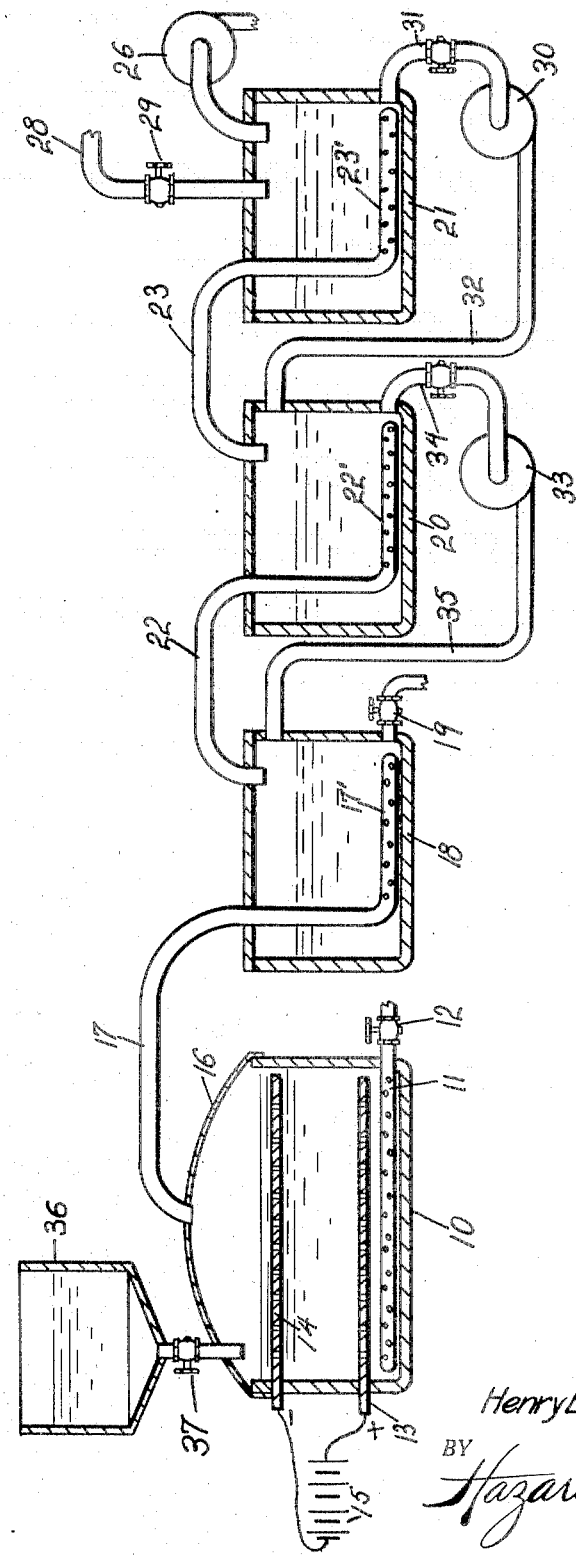

HENRY BLUMENBERG, JR., OF ORO GRANDE, CALIFORNIA.

ELECTRIC PRODUCTION OF AMMONIA.

1,388,448.  Specification of Letters Patent.  Patented Aug. 23, 1921.

Application filed May 12, 1919. Serial No. 296,556.

*To all whom it may concern:*

Be it known that I, HENRY BLUMENBERG, Jr., a citizen of the United States, residing at Oro Grande, in the county of San Bernardino and State of California, have invented new and useful Improvements in the Electric Production of Ammonia, of which the following is a specification.

My invention relates to a process of making ammonia.

It is an object of this invention to make ammonia by a simple and inexpensive process, and in which high temperatures are avoided.

My process depends upon the conversion of a metal nitrate into ammonia by means of electrolysis, the nitrogen required for the production of ammonia being supplied by atmospheric nitrogen and the hydrogen by nascent hydrogen liberated at the negative pole.

My invention consists in the steps of the process hereinafter described and claimed.

In the accompanying drawings which form a part of this specification I have illustrated an apparatus suitable for carrying out my process.

Referring to the drawings, 10 indicates an electrolyzation tank having a perforated pipe coil 11, controlled by a valve 12, for supplying air to the tank and disposed at the bottom thereof. A perforated electrode 13, preferably made of carbon, which constitutes the anode is disposed immediately above the coil 11. In the upper part of the tank 10 is another perforated electrode 14, preferably made of carbon, which constitutes the cathode. 15 is a source of electric energy supplying a direct current to the electrodes 13 and 14. 16 is a cover for the tank 10 from the top of which a pipe 17 leads to the lower part of a closed saturation tank 18 where it terminates in a perforated coil 17'. 19 is a valved outlet pipe leading from tank 18. 20 and 21 are saturation tanks communicating with tank 18. A pipe 22 leads from the top of the tank 18 to the bottom of the saturation tank 20, terminating therein in a perforated coil 22'. A pipe 23 leads from the top of the tank 20 to the bottom of the saturation tank 21 where it terminates in a perforated coil 23'.

28 is a water supply pipe which is controlled by a valve 29 and supplies the last saturation tank 21 with water. 30 is a pump connected by a valved pipe 31 to the last saturation tank 21 and communicates with saturation tank 20 by a pipe 32. A second pump 33 connected by a valved pipe 34 is adapted to pump the contents from tank 20 to tank 18 by means of a pipe 35. 36 is a supply tank having a valved outlet pipe 37 leading into the electrolyzation tank 10.

The electrolyzation tank 10 is filled with an aqueous mixture of sodium nitrate and calcium hydrate from the supply tank 36, the mixture in tank 10 extending above the upper electrode 14. The sodium nitrate and calcium hydrate are taken in equal proportions and the mixture contains approximately 25% of solids. The electric current is turned on, the E. M. F. is from two to four volts, the current ranging from ten to thirty amperes per square foot, which is sufficient to liberate the hydrogen at the cathode 13. Air under pressure is now supplied to the tank by means of the perforated coil 11. The air, in addition to supplying nitrogen for the production of ammonia, serves to keep the mixture in agitation.

A number of reactions occur during the process. The sodium nitrate near the cathode 13 is reduced by the nascent hydrogen liberated to sodium nitrite. The nitrogen supplied by the air and dissolved in the mixture will combine with a part of the hydrogen liberated at the cathode and form ammonia, which, reacting with the sodium nitrite, forms sodium hydroxid and ammonium nitrite, which is immediately attacked by the sodium hydroxid and calcium hydroxid in solution, forming the corresponding calcium and sodium nitrites and liberating ammonia, which, mixed with air, passes off from the mixture through pipes 17, 22 and 23 successively through the saturation tanks 18, 20 and 21, where the ammonia is absorbed by the water therein. It will be understood that more than three saturation tanks may be employed if necessary so that no free ammonia will escape through the fan 26. The ammonia solution in tank 18 is drawn off through the valved outlet pipe 19 at suitable intervals, while the solution from the tank 21 may be pumped to tank 20, and the solution from tank 20 may be pumped to tank 18, while water is supplied to the last tank 21 only.

It will be noted that the air and ammonia above the liquid in tanks 10, 18 and 20 is under an excess of atmospheric pressure. This pressure of the gases in electrolyzation tank 10 will assist in the formation of ammonia, for the reason that a greater amount of nitrogen of the air will pass into the solution. In place of air nitrogen alone may be supplied through pipe 11, but air will answer the same purpose.

The process depends upon the oxidizing action of the nascent oxygen at the anode which oxidizes the nitrites to nitrates, while the hydrogen at the cathode reduces the nitrates to nitrites and also forms ammonia, as explained above, the cycle of reaction being continuous.

I have found that other metal nitrates besides sodium nitrate may be used in my process, such as nitrates of iron, zinc, aluminum, calcium, magnesium and copper. Also other metal hydroxids in place of calcium hydroxid may be used, such as hydroxid of iron, aluminum, lead, zinc, lithium and copper. However, the sodium nitrate and calcium hydroxid are the cheapest nitrates and hydroxids respectively and their use is therefore preferred.

It is not essential to my process that a hydroxid of a metal be used, but the reaction of producing ammonia may be effected by subjecting the sodium nitrate alone to electrolyzation. Soon after the current is turned on hydrogen will cease to appear at the cathode, but, combining with the nitrogen dissolved in the mixture, will form ammonia. The presence of the metal hydroxids, like calcium hydroxid, merely assists to expel the ammonia from the mixture and out of the electrolyzation zone, thereby giving higher current efficiency.

The process above described utilizes the free nitrogen of the air in forming ammonia, and is therefore an economic process. However, it is not necessary that the nitrogen be supplied to the electrolyzation tank 10 in order to form ammonia. Sodium nitrate alone, when subjected to the electrolytic action of the current will be reduced to sodium nitrite and ammonia and sodium hydroxid will be formed, which latter will leave the tank and be absorbed in the saturation tanks, leaving the sodium hydroxid in the electrolyzation tank. The reaction taking place is shown in the following equations:

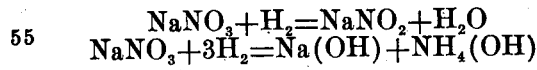

It is preferable to use calcium hydroxid in this process because it prevents the formation of ammonium nitrate and nitrite. The calcium hydroxid will form the corresponding nitrites and nitrates and expel the ammonia.

Where sodium nitrate is used without atmospheric nitrogen the efficiency of the process is lower than when the air is used in connection therewith, and the omission of the calcium hydroxid renders the process still less efficient.

The use of nitrogen or air is to be preferred in all cases because of the higher efficiency of the process.

Various changes in the steps of the process may be made by those skilled in the art without departing from the spirit of my invention as claimed.

I claim:

1. A process of making ammonia, comprising subjecting an aqueous solution of a metal nitrate of the alkali metal and alkaline earth metal groups to electrolysis, whereby the nitrate is first reduced to nitrite, and the nitrite is further reduced by the hydrogen generated to form ammonia and the hydroxid of the metal.

2. A process of making ammonia, comprising subjecting an aqueous solution of a metal nitrate of the alkali metal and alkaline earth metal groups to electrolysis in the presence of a metal hydroxid, giving an alkaline reaction whereby the nitrate is reduced to nitrite, and the nitrite in the presence of the hydrogen generated is converted into ammonia and the hydroxid of the metal base of the nitrate.

3. A process of making ammonia, comprising subjecting an aqueous solution of sodium nitrate to electrolysis, whereby the sodium nitrate is reduced to sodium nitrite and the sodium nitrite in the presence of the hydrogen generated is converted into ammonia and sodium hydroxid.

4. A process of making ammonia, comprising subjecting an aqueous solution of sodium nitrate to electrolysis in the presence of calcium hydroxid, whereby the sodium nitrate is reduced to sodium nitrite and the sodium nitrite in the presence of the hydrogen generated is converted into ammonia and sodium hydroxid.

5. A process of making ammonia, comprising subjecting an aqueous solution of metal nitrate of the alkali metal and alkaline earth metal groups to electrolysis in the presence of nitrogen, whereby the nitrate is reduced to nitrite and the nitrite in the presence of the hydrogen generated is converted into ammonia and hydroxid of the metal base of the nitrite.

6. A process of making ammonia, comprising subjecting an aqueous solution of sodium nitrate to electrolysis in the presence of nitrogen, whereby the sodium nitrate is reduced to sodium nitrite and the sodium nitrite in the presence of the hydrogen generated is converted into ammonia and sodium hydroxid.

7. A process of making ammonia, comprising subjecting an aqueous solution of metal nitrate of the alkali metal and alkaline earth metal groups to electrolysis in the presence of nitrogen and a metal hydroxid, whereby the nitrate is reduced to nitrite and the nitrite in the presence of the hydrogen generated is converted into ammonia and hydroxid of the metal base of the nitrite.

8. A process of making ammonia, comprising subjecting an aqueous solution of sodium nitrate to electrolysis in the presence of nitrogen and calcium hydroxid, whereby the sodium nitrate is reduced to sodium nitrite and the sodium nitrite in the presence of the hydrogen generated is converted into ammonia and sodium hydroxid.

9. A process of making ammonia, comprising subjecting an aqueous solution of a metal nitrate of the alkali metal and alkaline earth metal groups to electrolysis in the presence of air, whereby the nitrate is reduced to nitrite and the nitrite in the presence of the hydrogen generated is converted into ammonia and hydroxid of the metal base of the nitrite.

10. A process of making ammonia, comprising subjecting an aqueous solution of sodium nitrate to electrolysis in the presence of calcium hydroxid and air, whereby the sodium nitrate is reduced to sodium nitrite and the sodium nitrite in the presence of the hydrogen generated is converted into ammonia and sodium hydroxid.

11. A process of making ammonia, comprising subjecting an aqueous solution of sodium nitrate to electrolysis in the presence of calcium hydroxid whereby the sodium nitrate is reduced to sodium nitrite and the sodium nitrite in the presence of the hydrogen generated is converted into ammonia and sodium hydroxid causing air to pass into the solution; withdrawing the air and the ammonia formed through water to form a saturated solution of ammonia.

In testimony whereof I have signed my name to this specification.

HENRY BLUMENBERG, Jr.